March 4, 1952  J. DE MENT  2,587,976
METHOD AND APPARATUS FOR PLANIMETRY AND QUADRATURE
Filed Aug. 4, 1949

INVENTOR.

Patented Mar. 4, 1952

2,587,976

UNITED STATES PATENT OFFICE 2,587,976

METHOD AND APPARATUS FOR PLANIMETRY AND QUADRATURE

Jack De Ment, Portland, Oreg.

Application August 4, 1949, Serial No. 108,604

4 Claims. (Cl. 250—71)

1

This invention relates to method and means for planimetry and quadrature; particularly, to method and means for the measurement of irregular areas and to the determination of the area under a curve, as in graphs.

The objects of my invention include:

(a) method and means for measuring irregular areas and determining the areas of irregular planes; for example, the measurement of irregular areas on maps and the like.

(b) method and means for rapid quadrature, for the determination of the area under a graph curve without relying upon such higher mathematical techniques as are involved in the use of definite integrals, parametric equations, polar equations and the like.

Other objects of the present invention are given hereinafter.

Figure 1:
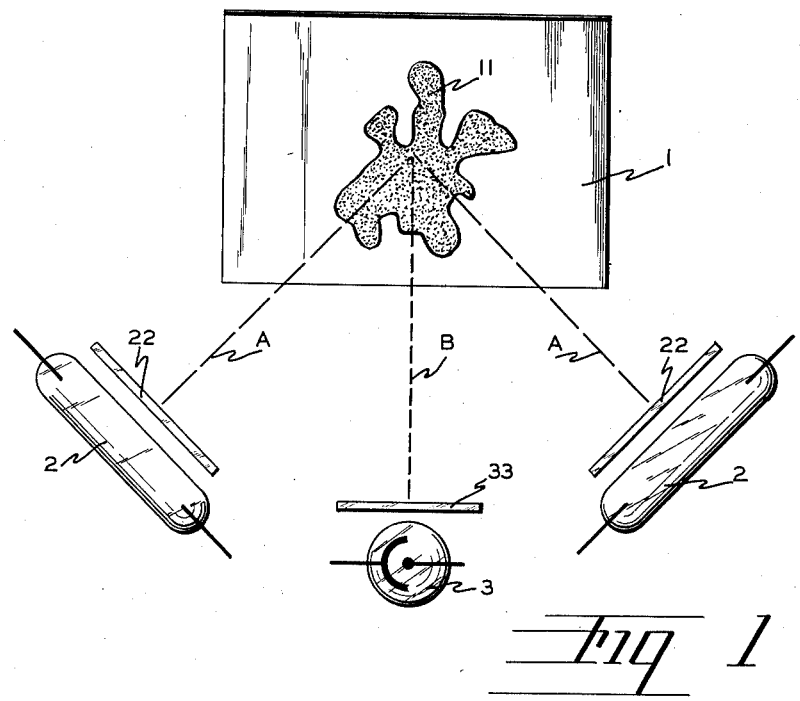

Referring to the accompanying figures:

Figure 1 shows a form of the present invention directed say to the planimetry of irregular map areas; the numeral 1 represents a map or like article, with 11 an irregular area or portion thereof; 2 is a source of ultraviolet light provided with a filter, 22; the rays originating at 2 are shown as A.

Further in Figure 1, the numeral 3 is a photoresponsive member such as a photoelectric cell provided with a filter, 33; the letter B shows light incident thereupon photoresponsive member.

Figure 2:
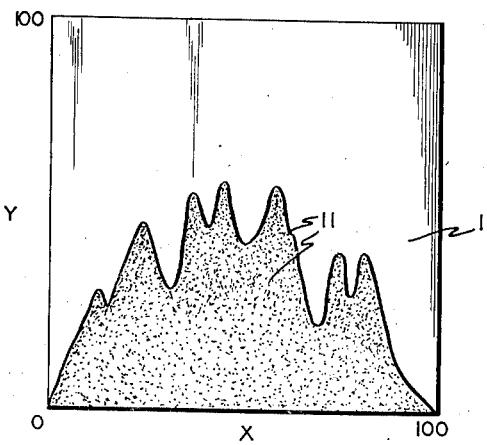

Figure 2 shows a modification of the present improvement for quadrature, i. e., determining the area under a curve; the numeral 1 shows the graph, provided with $x$ and $y$ coordinates which correspond to the edges of 1; 11 indicates the curve of the graph and the area thereunder curve.

According to a form of this invention, an area to be measured is made optically distinctive from another area on the same article, e. g., graph or map or picture, not to be measured. Thus, in Figure 1, area 11, which may be an irregular lake on a map, is rendered fluorescent. Upon irradiation of the fluorescent area, 11, with filtered ultraviolet light (free of visible wavelengths), the fluorescence, B, is received by the photocell or the like, 3, setting up an electrical current. The magnitude of the current is determined by suitable electrical measuring and/or amplifying means, well known to those skilled in the art, and this current is proportional to the area emitting fluorescent light, enabling measurement of the area when either the entire area of the map or the like is known in terms of fluorescent brightness (in terms of electrical current) or a known area of the map or the like is known in terms of fluorescent brightness (in terms of electrical current).

For example, if 1 square centimeter of fluorescent map area evokes 1 microampere of current in a photovoltaic cell (e. g., a selenium photoelectric cell), and the irregular, unknown area

2

(rendered fluorescent) gives a reading of 12 microamperes, and each square centimeter on the map corresponds to one square mile, then the irregular area will have a value of twelve square miles. Further details regarding this form of the present invention are given infra.

According to another form of the present invention, the reflected ultraviolet light is measured from either a known area (e. g., 1 cm.$^2$ or the like) or the entire area of the map or like article before the area to be measured is rendered fluorescent or in any other convenient way (if a known, small area is available for ultraviolet reflectance measurement, then the rendering of fluorescence can be undertaken initially, as desired); hence, since the fluorescent area acts to totally absorb the ultraviolet light, the value is determined as before, except in the inverse manner.

According to the medium being planimetered or quadratured, varying degrees of correction must be made for (a) the normal fluorescence of the surface or (b) the normal ultraviolet absorbing value of the surface. The medium which carries the map, graph or graphical representation of numbers and the like, may vary greatly and widely in character, and for example include paper, cloth, plastic, wood, thin metal, glass and the like.

In the form of the present invention wherein the area to be measured is rendered fluorescent, the filter, 22, is opaque to visible light and transparent to ultraviolet light; also, the filter, 33, is opaque to ultraviolet light and transparent to visible light (fluorescence). When the ultraviolet reflectance method is employed, then filter, 22, may be dispensed and is therefor optional, but filter, 33, must be opaque to visible light and transparent to ultraviolet light.

A number of suitable filters have been developed which possess the afore-described characteristics, and these being well known to those skilled in the art need no further description here. As desired, and depending upon the characteristics of the fluorescent material employed to render the area, 11, luminescent, the ultraviolet light source may be replaced by a source of short wavelength visible rays, e. g., an incandescent lamp, in which case the filter, 22, is say a monochromat that passes for example blue or violet light; also, the filter, 33, in such a case is opaque to the exciting wavelengths but transparent to the visible fluorescent wavelengths.

Otherwise, the source of ultraviolet light may be a high-pressure mercury arc, emitting largely at 3650 Angstrom units; a low-pressure mercury arc, emitting largely at 2537 Angstrom units; a carbon or iron arc; a tungsten filament lamp operating in excess of its rated current value; a fluorescent lamp with an ultraviolet emitting phosphor coating; or the like. Whereas, Figure 1 shows two ultraviolet or other light sources, at 2, this is not mandatory, and one light source can be employed for small areas, or, a plurality of light sources for large areas, just so the irradiation or illumination is uniform.

As to the photoresponsive member, 3, this may be a photovoltaic element like a selenium cell, a photosensitive or light-actuated phototube, a Geiger counter tube, a photomultiplier tube or the like, as desired. The photoresponsive member, 3, is in comunication with a suitable electrical energy indicating and/or amplifying means, many forms of which are well known to those skilled in the art and hence are not shown on the accompanying drawings. If the element, 3, is a selenium cell, then a microammeter or a milliameter is suitable; if a phototube is used instead, then the customary current amplifying methods and means are employed; likewise for a photomultiplier tube or a Geiger counter.

As to the fluorescent, ultraviolet light-absorbing means for treating an area to be measured, many different substances can be employed. For paper maps, graph plotting, and the like, a water, or water-alcohol solution of tetrabromoresorufin-ammonium (e. g., 0.1 to several per cent) proves very suitable, particularly because the treatment does not impart color to the paper or the like; other fluorescent dyestuffs, such as those of No. 654 of the "color index" (fluorescent purple 2G; paper white GDC), are likewise satisfactory, including solutions of sodium naphthol sulfonic acids (colorless; blue fluorescent), 1,3,5-triazine derivatives and the condensation product of benzoin and urea ("ultrasan" and "blankophors").

Likewise, dilute solutions (water, alcohol, acetone, glycerol, and the like) of colored fluorescent dyestuffs may be used, but these are less desirable; examples include eosin, rhodamine, acridine, auramine, and the like. Quick-drying fluorescent solutions, which are colorless in visible light, can be made by dissolving anthracene, naphthacene, phenanthrene or like fluorescent polycyclic hydrocarbons in organic solvents such as carbon tetrachloride, chloroform, benzene, and absolute alcohol.

The fluorescent (or ultraviolet-absorbing) solution, supra, can be printed onto the map during its making, or, if the map is old (e. g., from the archives) and otherwise not specially treated, the area(s) to be measured are inked in by hand with a pen or brush or the like. As desired, a porous area or paper or the like may be treated by rubbing with dry luminescent powder, of say finer than 500-mesh, such as calcium tungstate phosphor, zinc orthosilicate phosphor, copper-activated zinc sulfide, or the like. Moreover, a fluorescent crayon or pencil may be used for rendering the area fluorescent or ultraviolet-absorbing, and, as is well known to those skilled in the art, such pencils or crayons may leave a colorless or colored mark.

In securing a reference area for the planimetry and/or quadrature or the like, depending upon the circumstance of application hereof improvement, a known area may be treated; or, the entire reverse side of a map treated. It is not necessary that the area, 11, shown in Figure 1, be treated, for the reverse procedure can be used, and area, 1, can be treated, with area, 11, left intact, as desired and as may be convenient in a given application.

Whereas luminescent or ultraviolet-absorbing treatment will be most employed, these are not inclusive of the only forms hereof invention.

Thus, the use of a solution of soluble uranyl salt, or of a colloidal suspension of hydrated uranium trioxide salt, or, of uraniferous paint or crayon, which while providing fluorescence, also enable elimination of a source of exciting light because of their radioactivity. Hence, with a Geiger counter, preferably a rate-meter (commonly known as an "r-meter" or roentgen meter) the planimetry and/or quadrature or the like is accomplished by a measurement of the radioactivity. Therefore, thorium salts, radium-barium concentrates, or, in fact, highly active radioactive minerals, can also be employed, including artificial radioisotopes. These are applied and determined as before, except by their radioactivity.

In addition to the afore-mentioned and described articles, e. g., maps, paper or other graphs and plottings, the present methods and means include blue-prints, photographs, plans for structures such as ships and buildings; moreover, not to be excluded from the spirit and scope hereof improvement are irregular articles such as templates, patterns, and the like. These latter articles, as is well known, take a variety of forms in the construction and building arts and industries, and such modifications in application hereof are not to be taken as violating the spirit and scope of my invention.

I claim:

1. The method for the measurement of an irregular surface which comprises the steps of rendering the said irregular surface luminescent, the irradiation of the luminescent surface with exciting radiation, the measurement of the luminescence intensity of the surface, and the comparison of the said irregular surface luminescence intensity with the luminescence intensity of a surface of known area.

2. The method for the measurement of an irregular surface which comprises the steps of rendering the said irregular surface fluorescent, the irradiation of the fluorescent surface with ultraviolet light, the measurement of the fluorescence intensity of the surface, and the comparison of the said irregular surface fluorescence intensity with the fluorescence intensity of a surface of known area.

3. The method for the measurement of an irregular surface which comprises the steps of rendering the said irregular surface ultraviolet light absorbing, the irradiation of the absorbing surface with ultraviolet light, the measurement of the loss in ultraviolet light reflection of the surface, and the comparison of the said measurement with the ultraviolet light reflection of a surface of known area.

4. Apparatus for the measurement of an irregular surface comprising means for rendering the said surface luminescent, means for exciting luminescence in the said surface, and means for the measurement of the luminescence intensity of the said surface, effective for the measurement of the irregular surface upon comparison of the said luminescence intensity with the luminescence intensity of a surface of known area.

JACK DE MENT.

REFERENCES CITED

The following references are of record in the file of this patent:

UNITED STATES PATENTS

| Number | Name | Date |
|---|---|---|
| 2,149,958 | Fox | Mar. 7, 1939 |
| 2,462,351 | Blau et al. | Feb. 22, 1949 |